(12) United States Patent
Johnson et al.

(10) Patent No.: US 6,628,229 B1
(45) Date of Patent: Sep. 30, 2003

(54) STABILIZATION OF OSCILLATORS IN A RADAR LEVEL TRANSMITTER

(75) Inventors: James A. Johnson, Savage, MN (US); Eric R. Lovegren, Big Lake, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 10/209,732

(22) Filed: Aug. 1, 2002

(51) Int. Cl.[7] .............................................. G01S 13/08
(52) U.S. Cl. ...................... 342/124; 342/175; 73/290 R
(58) Field of Search ................................ 342/124, 134, 342/135, 175; 73/290 R

(56) References Cited

U.S. PATENT DOCUMENTS

| | | | |
|---|---|---|---|
| 5,563,605 A | 10/1996 | McEwan | 342/202 |
| 5,589,838 A | 12/1996 | McEwan | 342/387 |
| 5,609,059 A | 3/1997 | McEwan | 73/290 |
| 5,610,611 A | 3/1997 | McEwan | 342/89 |
| 5,672,975 A * | 9/1997 | Kielb et al. | 324/644 |
| 5,774,091 A | 6/1998 | McEwan | 342/387 |
| 6,055,287 A | 4/2000 | McEwan | 375/376 |
| 6,072,427 A | 6/2000 | McEwan | 342/175 |
| 6,107,957 A | 8/2000 | Cramer et al. | 342/124 |
| 6,137,438 A | 10/2000 | McEwan | 342/134 |
| 6,191,724 B1 | 2/2001 | McEwan | 342/21 |
| 6,281,833 B1 | 8/2001 | Pringle et al. | 342/95 |
| 6,300,897 B1 | 10/2001 | Kielb | 342/124 |
| 6,320,532 B1 | 11/2001 | Diede | 342/124 |
| 6,373,261 B1 * | 4/2002 | Kielb et al. | 324/644 |

FOREIGN PATENT DOCUMENTS

DE 298 15 069 U1 2/1999

OTHER PUBLICATIONS

"Phase–Locked Loop Design Fundamentals", by G. Nash et al., Motorola Semiconductor Application Note, AN535, 1994, pp. 1–12.
"The MC145170 in Basic HF and VHF Oscillators", by D. Babin et al., Motorola Semiconductor Technical Data, AN1207, 1998, pp. 1–6.
"Offset Reference PLLs for Fine Resolution or Fast Hopping", by M. Smith, Motorola Semiconductor Technical Data, AN1277, 1996, pp. 1–8.
"MC145170 PSpice Modeling Kit", by O. Cogburn, Motorola Semiconductor Application Note, AN1671, 1998, pp. 1–16.
"PLL Frequency Synthesizer with Serial Interface", Motorola Intelligence Everywhere, MC145170–2, 1999, pp. 1–26.
Webpages entitled "MC145170–2: PLL Frequency Synthesizer with Serial Interface", 2 pgs.
Electronic Designers' Handbook, First Edition by R. Landee et al., p. 25–10.
"Novel Methods of Measuring Impurity Levels in Liquid Tanks", by M. Weiss et al., *IEEE MTT–S Digest*, 1997, pp. 1651–1654.

\* cited by examiner

*Primary Examiner*—John B. Sotomayor
(74) *Attorney, Agent, or Firm*—Westman, Champlin & Kelly, P.A.

(57) ABSTRACT

A low power pulsed radar level transmitter has first and second pullable oscillator circuits that are offset from one another by a frequency offset. A third or reference crystal oscillator couples a reference frequency output to phase comparators in both the first and second crystal oscillator circuits. The phase comparators adjust biases on varactor diodes that pull the transmit and receive frequencies.

16 Claims, 7 Drawing Sheets

STABILIZATION OF OSCILLATORS IN A RADAR LEVEL TRANSMITTER

FIELD OF THE INVENTION

The present invention relates generally to methods and apparatus for measuring liquid or granular solids product levels in containers. In particular, the present invention relates to stabilization of oscillators in low power pulsed radar level transmitters.

BACKGROUND OF THE INVENTION

Low power pulsed radar level transmitters typically include transmit and receive oscillators that are offset from one another by a frequency offset. The stability of the radar level transmitter output depends on stabilizing the frequency offset. In one stabilization scheme, one of the two oscillators has been used to control the frequency of the other oscillator in an effort to stabilize the offset frequency. In another stabilization scheme, the frequency offset is sensed and used to control the frequency of one of the oscillators in an effort to stabilize the offset frequency. High power stabilization techniques with complex circuitry or crystal ovens cannot be used without exceeding the power supply limitations of an energy limited 4–20 mA loop that powers the level transmitter. The stabilization achieved within the power limitation has been inadequate, and a method and apparatus are needed that can stabilize a frequency offset without using power or energization in excess of that available from a two wire, 4–20 mA loop that provides all of the power or energization to the radar level transmitter.

SUMMARY OF THE INVENTION

Disclosed is a level transmitter that includes a first pullable oscillator circuit that provides a transmit frequency output, and a second pullable oscillator circuit that provides a receive frequency output. The receive frequency output is offset from the transmit frequency output by a frequency offset.

A first pulse generator receives the transmit frequency output and provides microwave transmit pulses couplable to the product level. A second pulse generator receives the receive frequency output and provides microwave gating pulses.

A gate receives the microwave gating pulses and is coupled to the product level for receiving microwave transmit pulses reflected back from the product level that are delayed by a reflection delay time. The gate provides a gated delayed pulse output. A controller receives the gated delayed pulse output and provides a level output representative of the product level.

A reference crystal oscillator circuit provides a reference frequency output that couples to the first and second pullable oscillators. The transmit and receive frequency outputs are pulled as functions of the reference frequency output.

These and various other features as well as advantages that characterize the present invention will be apparent upon reading of the following detailed description and review of the associated drawings.

DETAILED DESCRIPTION OF ILLUSTRATIVE EMBODIMENTS

In the embodiments illustrated below, a low power pulsed radar level transmitter includes first and second pullable oscillator circuits that are offset from one another by a frequency offset. The first pullable oscillator circuit provides a transmit frequency output and the second pullable oscillator circuit provides a receive frequency output. A third or reference crystal oscillator couples a reference frequency output to phase comparators in both the first and second crystal oscillator circuits. The phase comparators adjust biases on varactor diodes that pull the transmit and receive frequencies. The frequency offset is extremely stable, and accuracy and stability of the low power pulsed radar level transmitter output is enhanced.

Figure 1:
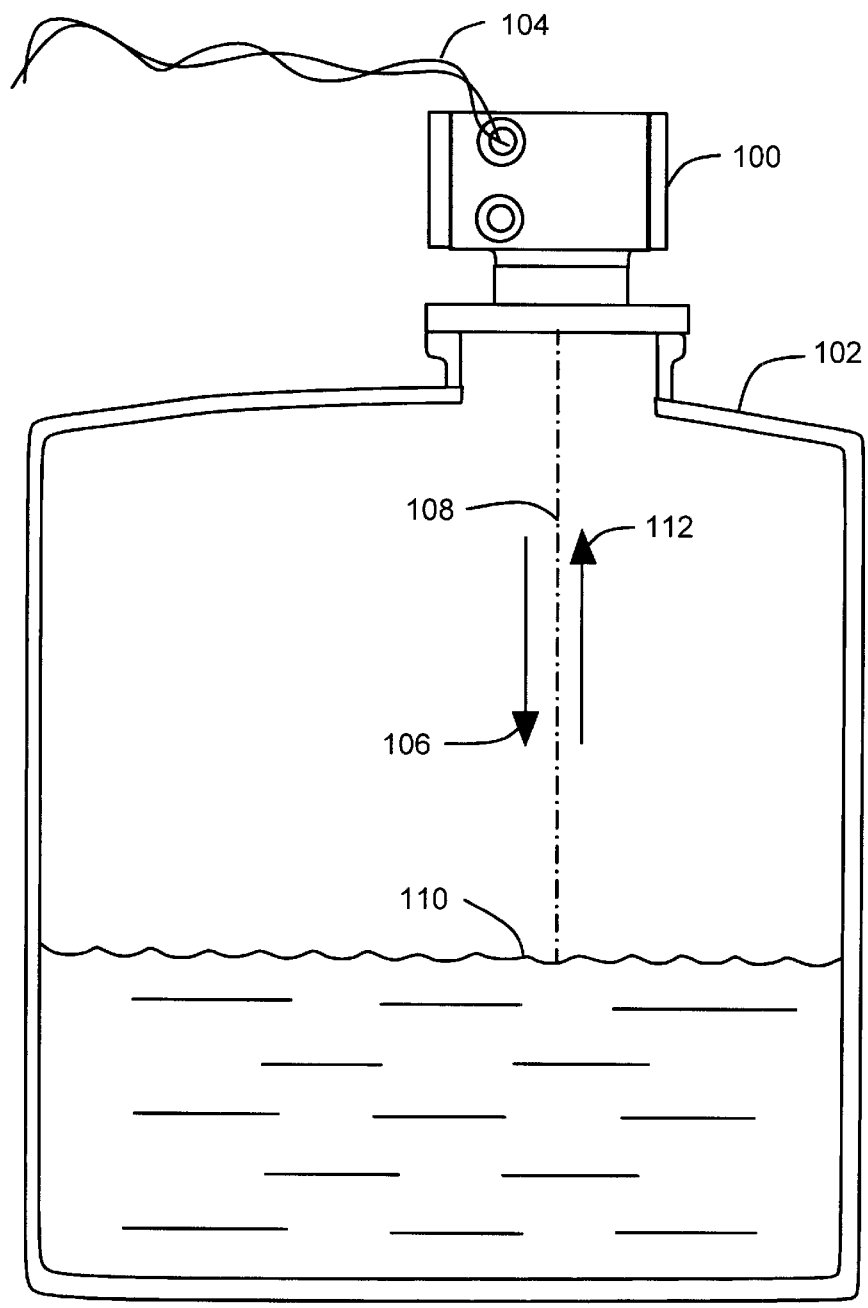
FIG. 1 illustrates a product level transmitter installation on an industrial storage container.

FIG. 1 illustrates a product level transmitter 100 installed on an industrial storage container 102. Product level transmitter 100 connects to an industrial process control system (not illustrated) by way of a bus 104. Bus 104 is preferably a 2-wire, 4–20 mA industrial current loop (also called a telemetry loop) that provides all of the energization for the transmitter 100. Bus 104 can also comprise any known industrial field bus such as Foundation Fieldbus, Profibus, or CAN.

The product level transmitter 100 transmits a microwave pulse 106 along a transmission axis 108 to a product level surface 110 inside the container 102. The transmitted pulse 106 is reflected off of the product level surface 110 and returns to the transmitter 100 as a reflected pulse 112. There is a time delay associated with the travel of the transmitted pulse from the transmitter 100 to the product level surface 110 and back from the product level surface 110 to the transmitter 100. The transmitter 100 measures this reflection time delay and, using a known speed of propagation of the microwaves, calculates the distance between the transmitter 100 and the product level surface 110. Using known dimensions of the tank, the transmitter calculates the product level (or volume, or mass) of the product in the storage tank and provides an output to the bus 104.

Transmitter 100 measures the reflection time delay to a high degree of precision and stability, consistent with the needs of an industrial process control system (not illustrated) connected to the bus 104. Stable measurements of the reflection delay time need to be made in spite of short term variations in temperature as well as long term drift in frequencies of oscillators included in the product level transmitter 100.

Only a very limited amount of electrical power is available from the bus 104. When a fault or short circuit occurs, it is a requirement in many industrial applications for the circuitry connected to bus 104 to avoid producing any sparks with power sufficient to ignite a flammable atmosphere surrounding the bus. Because of the extremely limited power availability in the transmitter, conventional stabilization methods such as crystal ovens can't be used. Transmitters that stabilize their crystal oscillators without high power consumption are needed. Examples of such low power, stable transmitters are described below in connection with FIGS. 2–7.

Figure 2:
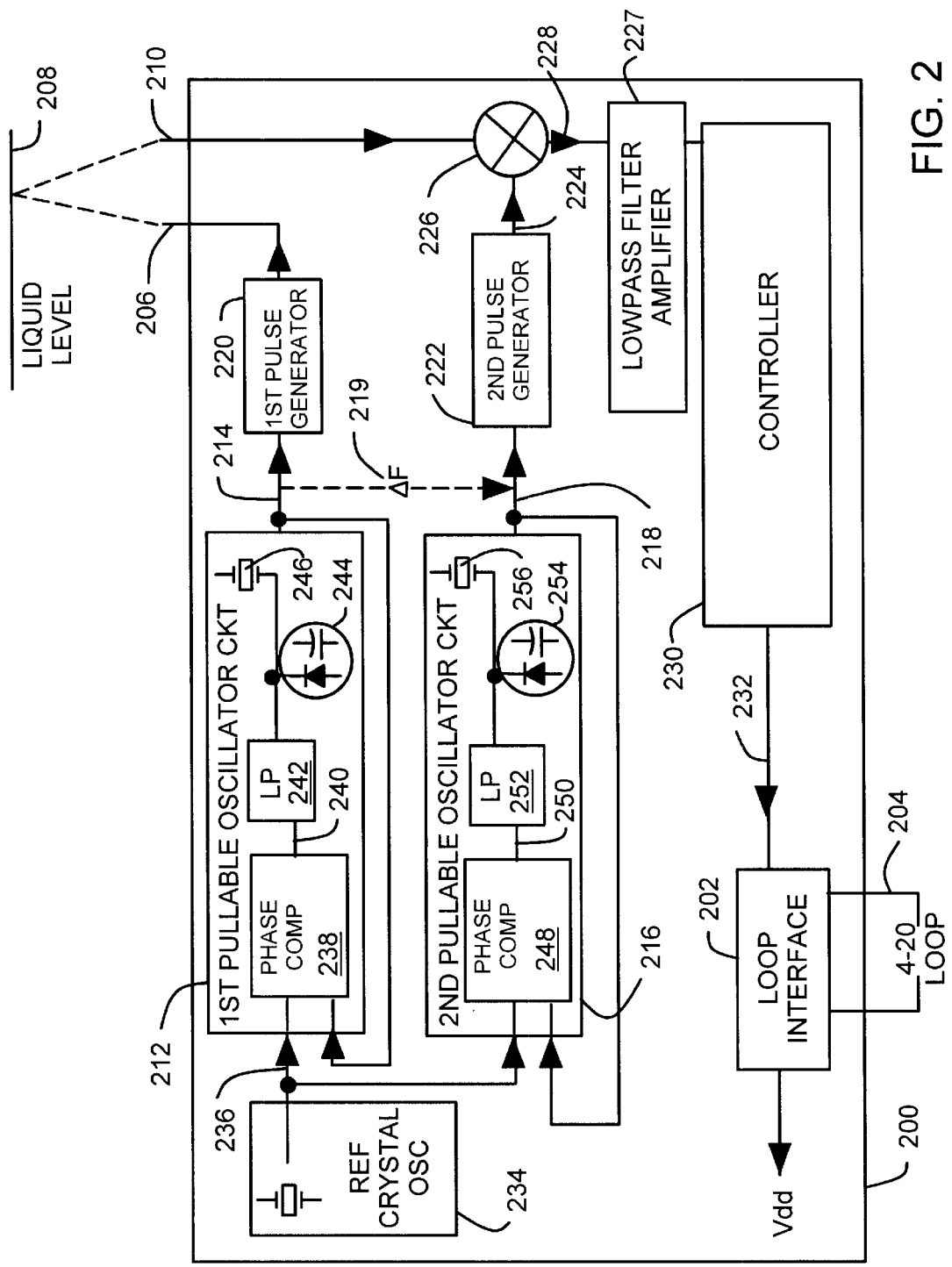
FIG. 2 schematically illustrates a block diagram of a first embodiment of product level transmitter.

FIG. 2 schematically illustrates a block diagram of a first embodiment of a product level transmitter 200. Product level transmitter 200 includes an interface circuit 202 that interfaces with a 2 wire, 4–20 mA loop 204 that provides all of the power to the transmitter 200. The interface circuit 202 derives power from the loop 204 and provides a power supply voltage Vdd that energizes all of the circuitry in transmitter 200. The transmitter 200 transmits microwave pulses along line 206. The microwave pulses travel to a product level surface 208 and are reflected back from the product level surface 208 to line 210 of the transmitter 200. Transmitter 200 can be connected with any known radar transmission path between the transmitter 200 and the product level surface 208. For example, the transmission path may include an antenna coupling through a path in a container or may include any of various known types of transmission lines extending from the radar level transmitter 200 to the product level 208. A radar antenna, one or more wires, a transmission line cable, or a waveguide can be used to transmit microwave pulses back and forth between the transmitter 200 and the product level 208.

The product level transmitter 200 comprises a first pullable oscillator circuit 212 that provides a transmit frequency output 214. Transmit frequency output 214 has a transmit frequency that preferably is in the range of about 2 megahertz. The product level transmitter 200 also comprises a second pullable oscillator circuit 216 that provides a receive frequency output 218. The receive frequency output 218 is offset from the transmit frequency output 214 by a frequency offset ΔF illustrated at 219. The frequency offset 219 can be any value, but is usually fixed. A frequency offset of approximately 1.0 hertz can be used, for example. Preferably, the transmit frequency output 214 has a higher frequency than the received frequency output 218.

The term "pullable oscillator" means a stable oscillator, such as a crystal oscillator, that is an oscillator circuit that includes an oscillator, such as a quartz crystal, and also includes a voltage variable capacitor ("varactor") that can be adjustably biased to pull the oscillator frequency away from its nominal value by an extremely small amount, typically no more than 200 parts per million. The pullable oscillator has the advantages of high stability, but also has the advantage of an extremely small amount of adjustability. Pullable oscillators have a greatly enhanced stability in comparison with ordinary voltage controlled oscillators (VCOs) that do not include a resonant frequency controlling element such as a crystal. Other types of oscillators that have stability that is comparable to that of crystal oscillators, and that can be pulled by only a small amount can also be used as pullable oscillators.

A first pulse generator 220 receives the transmit frequency output 214 and provides microwave transmit pulses on line 206 that are coupled to the product level 208. A second pulse generator 222 receives the receive frequency output 218 and provides microwave gating pulses on line 224. The first and second pulse generators 220, 222 operate in the gigahertz range of frequencies. A gate 226 receives the microwave gating pulses from line 224. The gate 226 also couples along line 210 to the product level 208 for receiving microwave transmit pulses reflected back from the product level 208 that are delayed by a reflection delay time. The gate 226 provides a gated delayed pulse output 228. The gate 226 can be seen as a pulse demodulator or pulse mixer. The microwave transmit pulses on line 206, the reflected pulses on line 210 and the microwave gating pulses on line 224 are all extremely short in duration, in other words, microwave pulses.

A controller 230 receives the gated delayed pulse output 228 and provides a level output 232 representative of the product level. The level output 232 is in a digital format, and the loop interface circuit 202 converts the digital level output 232 to a form suitable for analog transmission over the 4–20 loop 204.

A reference crystal oscillator circuit 234 provides a reference frequency output 236 that couples to the first and second pullable oscillators 212, 216. The transmit and receive frequency outputs 214, 218 are pulled as functions of the reference frequency output 236.

The first pullable oscillator circuit 212 is also pulled as a function of its own output, the transmit frequency output 214. A first phase comparator 238 in the first crystal oscillator circuit 212 receives the reference frequency output 236 and the transmit frequency output 214 and provides a phase comparison output 240. The phase comparison output 240 is coupled through a low pass filter 242 to a varactor diode 244. Varactor diode 244 is coupled to a crystal 246 and pulls the frequency of oscillation of the crystal 246 as a function of the phase comparison. In spite of short term variations due to temperature and long term drift of the crystal 246, the transmit frequency output 214 is pulled to a frequency set by the reference frequency output 236.

The second pullable oscillator 218 operates in substantially the same way as the first pullable oscillator 212. The second pullable oscillator circuit 216 is also pulled as a function of its own output, the receive frequency output 218. A second phase comparator 248 in the second crystal oscillator circuit 216 receives the reference frequency output 236 and the receive frequency output 218 and provides a phase comparison output 250. The phase comparison output 250 is coupled through a low pass filter 252 to a varactor diode 254. Varactor diode 254 is coupled to a crystal 256 and pulls the frequency of oscillation of the crystal 256 as a function of the phase comparison. In spite of short term variations due to temperature and long term drift of the crystal 256, the receive frequency output 218 is pulled to a frequency set by the reference frequency output 236.

Both the transmit frequency output 214 and the receive frequency output 218 are pulled as functions of the same reference frequency 236. The short term temperature drift and long term drift of the transmit frequency output 214 and the receive frequency output 218 are both set by the reference frequency. The reference frequency may drift, but the frequency difference ΔF between the transmit frequency and the receive frequency remains stable.

The first pullable oscillator circuit 212 comprises first circuit components 238, 242, 244, 246 that are substantially identical to second circuit components 248, 252, 254, 256 in the second pullable oscillator 216. The first and second circuit components have differing component parameters to provide the frequency offset ΔF. In one preferred arrangement, the phase comparators 238, 248 are realized using integrated circuit part numbers MC145170 manufactured by Motorola, Inc., Denver, Colo., USA and at http://www.motorola.com/semiconductors/. The first pullable oscillator circuit 212 preferably comprises a first crystal 246 and a first varactor diode 244, and the transmit frequency is pullable in a range of less than 200 parts per million. The second pullable oscillator circuit 216 preferably comprises a second crystal 256 and a second varactor diode 254, and the receive frequency is pullable in a range of less than 200 parts per million.

Figure 3:
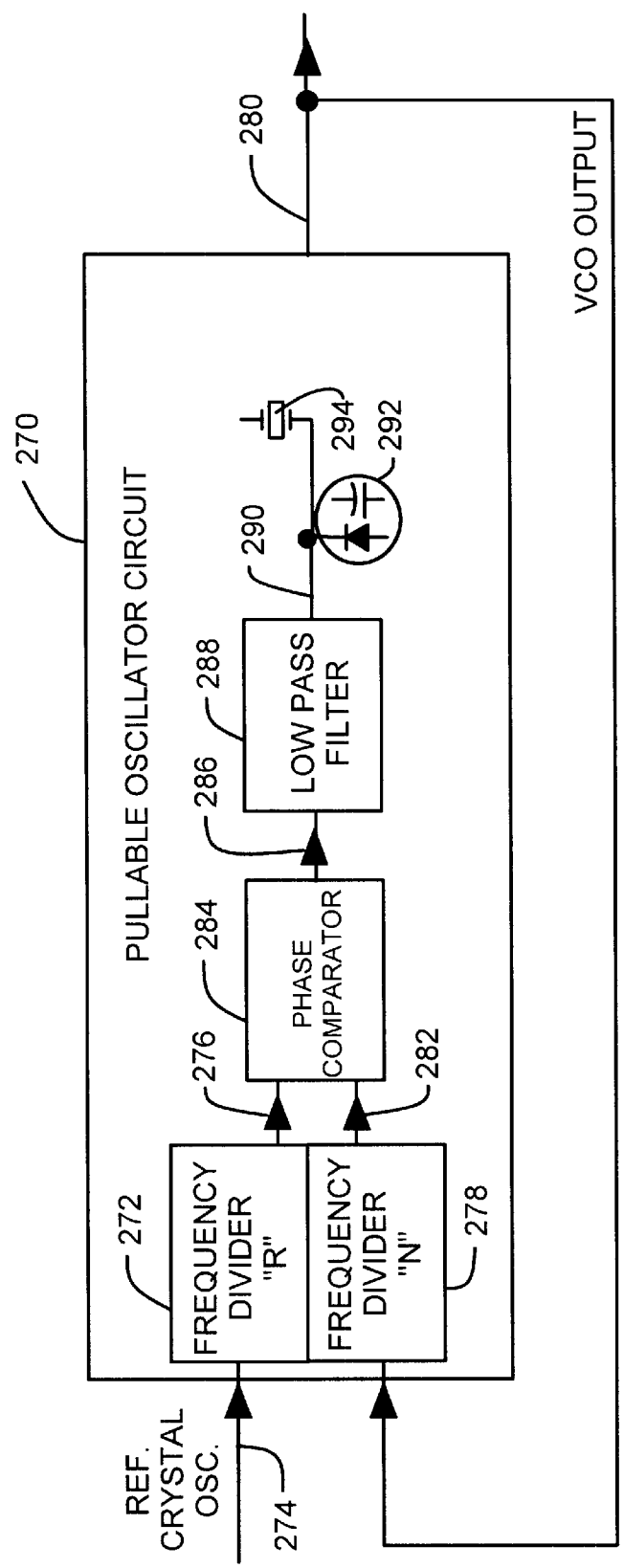
FIG. 3 schematically illustrates an alternative embodiment of a pullable oscillator circuit.

FIG. 3 schematically illustrates an alternative embodiment of a pullable oscillator circuit 270. Pullable oscillator 270 comprises a first frequency divider 272 that receives a reference crystal oscillator frequency output 274 and provides a divided output 276 that is divided by a factor R. Pullable oscillator 270 also comprises a second frequency divider 278 that a VCO output 280 and provides a divided output 282 that is divided by a factor N. The divided outputs 276, 282 couple to a phase comparator 284. A phase detector output 286 couples to a low pass filter 288. A low pass filter output 290 couples to a varactor diode 292 and a crystal 294 to pull the frequency of oscillation as a function of the detected phase difference between divided frequency outputs 276, 282. The pullable crystal oscillator 270 can be constructed using know types of components including digital or analog small scale integrated circuits, medium scale integrated circuits, large scale integrated circuits, as well as discrete components and operational amplifiers. The pullable crystal oscillator 270 can be used in place of pullable crystal oscillators 212, 216 illustrated in FIG. 2.

The operation of the product level transmitter 200 in FIG. 2 is explained in more detail below in connection with a timing diagram illustrated in FIG. 4.

Figure 4:
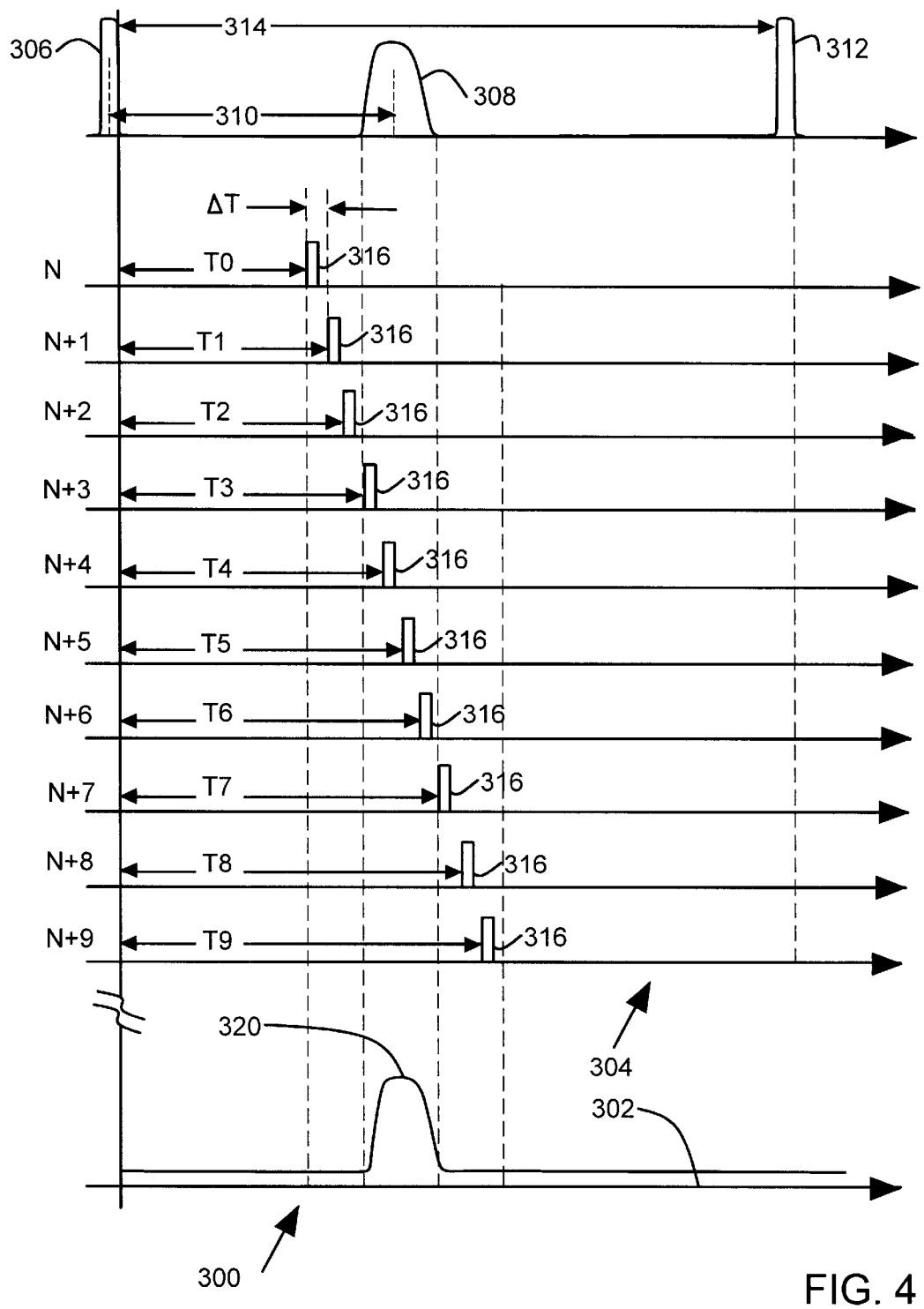
FIG. 4 illustrates a timing diagram.

In FIG. 4, a timing diagram 300 shows timing relations between various outputs illustrated in FIG. 2. Each horizontal axis in the timing diagram is representative of time. Horizontal time axis 302 has a much longer time scale (slower sweep rate) than the remaining horizontal time axes 304. Each vertical axis in the timing diagram is representative of amplitude of one of the various outputs.

A transmit pulse 306 is transmitted to the product level 208 (FIG. 2). After the pulse has traveled to the product level surface 208, it returns as a received pulse 308. There is a time delay 310 between the transmit pulse 306 and the receive pulse 308. The time delay 310 is representative of the product level. Microwave transmit pulses are transmitted repetitiously at regular intervals, and a subsequent transmit pulse 312 is also illustrated.

During a time interval 314 between a transmit pulse 306 and a subsequent transmit pulse 312, a single gating pulse 316 is generated. As time intervals 314 occur repetitiously, microwave gating pulses 316 numbered 1, 2, 3, ... N, N+1, N+2, N+3, N+4, N+5, N+6, N+7, N+8, N+9, .... M are generated as illustrated in FIG. 4. The transmit frequency output 214 differs from the receive frequency output by a small frequency offset ΔF, and therefore the phase relationship between the transmit pulse 306 and the microwave gating pulses 316 shifts in small steps from one time interval 314 to the next time interval 314. With each successive transmit pulse 306, the gating pulse 316 delay moves a small time step ΔT as illustrated.

The gating delay time (T0, T1, T2, T3, T4, T5, T6, T7, T8, T9) between the microwave transmit pulses 306 and the microwave gating pulses 316 sweeps across a range of gating delay times that correspond with a range of product levels. The gating delay time (T1, T2, T3, T4, T5, T6, T7, T8, T9) sweeps at a sweep rate that is stabilized by pulling both the transmit frequency output 214 and the receive frequency output 218 as functions of the same reference frequency output 236.

The gated delayed pulse output 228 (FIG. 2) passes through a low pass filter and amplifier 227 and is digitized in the controller 230 (FIG. 2) to form a digitized received pulse 320 on the slower time scale 302. The time scale 302 is approximately M times slower than the time scales 304 and the received pulse 320 is also referred to as an "equivalent-time" signal. The integrated received pulse 320 is thus not a microwave pulse, but is a much slower pulse that can be easily processed by low frequency, low digital circuitry in the controller 230. When the transmit oscillator output has a frequency of 2 megahertz, and the frequency offset ΔF is 1 hertz, then the number M is approximately 2,000,000.

Figure 5:
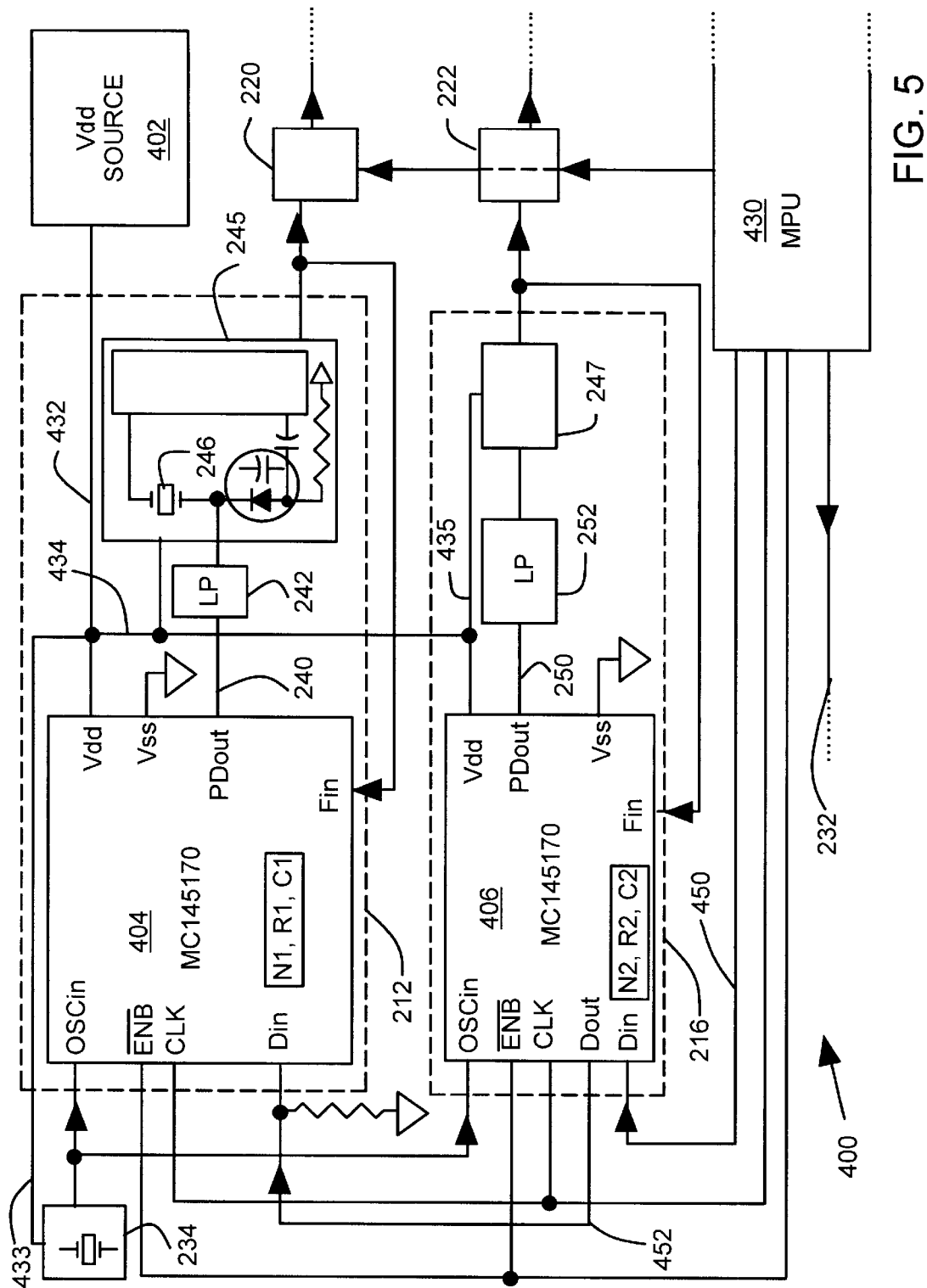
FIG. 5 schematically illustrates a block diagram of a second embodiment of a product level transmitter.

FIG. 5 schematically illustrates a block diagram of a portion of a second embodiment of a product level transmitter 400. Transmitter 400 is similar to transmitter 200 and the same reference number are used in FIG. 5 to identify features that are similar to those in FIG. 2. In FIG. 5, the first pullable oscillator 212 is constructed essentially the same as the second pullable oscillator 216. An integrated circuit MC145170, PLL Frequency Synthesizer with Serial Interface manufactured by Motorola is used as a phase comparator 404 in the first pullable oscillator 212 and as a phase comparator 406 in the second pullable oscillator 216 in FIG. 5. A microprocessor 430 provides controller functions equivalent to those of controller 230 in FIG. 2.

A source of energization, Vdd source 402, provides energization along lines 432, 433, 434, 435 to the phase comparators 404, 406, the crystal oscillators 245, 247 and the reference oscillator 234. The transmit frequency, the receive frequency and the reference frequency are each preferably less that 2.5 MHz and the first and second pullable oscillator circuits and the reference oscillator circuit have a combined power consumption of less than 10 milliwatts. The selection of oscillator frequencies less than 2.5 MHz and a rail voltage of 3.0 volts or less allows the transmitter 400 to operate within the power constraints set by the 4–20 mA loop that powers the transmitter.

The first phase comparator 404 pulls the transmit frequency as a function of a phase comparison of the reference frequency output divided by R1 and the transmit frequency output divided by N1 where R1 and N1 are frequency division factors set in the phase comparator part number MC145170. The second phase comparator 406 pulls the receive frequency as a function of a phase comparison of the reference frequency output divided by R2 and the receive frequency output divided by N2 where R2 and N2 are frequency division factors set in the phase comparator part number MC145170. The microprocessor 430 couples to the first and second pullable oscillator circuits 212, 216 along a serial bus 450, 452. The microprocessor 430 provides the frequency division factors R1, N1, R2, N2 along the serial bus 450, 452. The microprocessor also provides configuration settings C1, C2 along the serial bus 450, 452 to the first and second phase comparators 404, 406 respectively. The microprocessor 430 can provide the frequency division factors R1, N1, R2, N2 and the configuration settings C1, C2 during a startup time interval following application of power to the product level transmitter. In one preferred arrangement, the frequency division factors R1, N1 differ from the frequency division factor R2, N2 by an amount that causes the frequency offset. The frequency division factors can also be hard wired.

Figure 6:
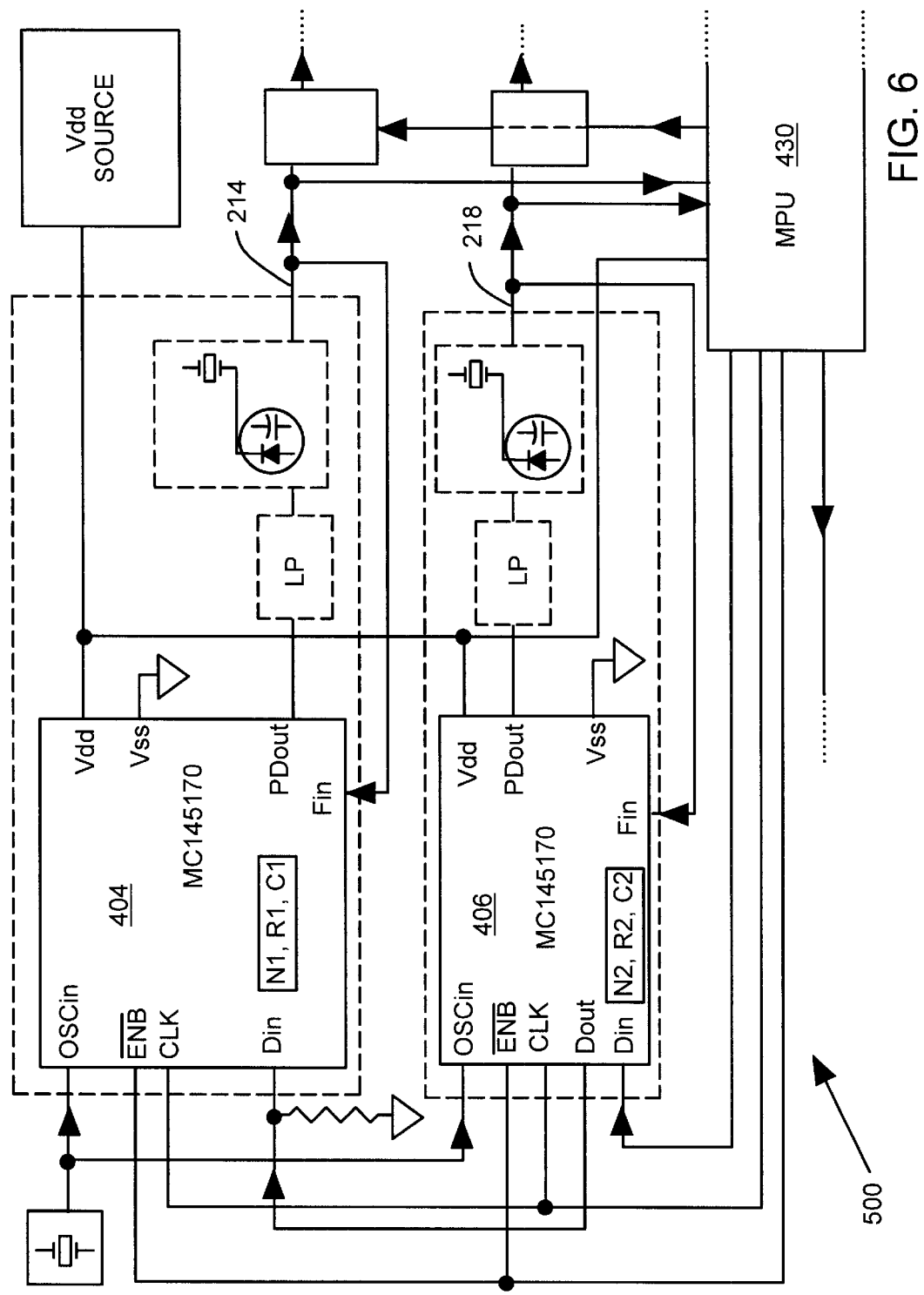
FIG. 6 schematically illustrates a block diagram of a third embodiment of product level transmitter.

FIG. 6 schematically illustrates a block diagram of a third embodiment of a product level transmitter 500. Product level transmitter 500 is similar to product level transmitter 400 in FIG. 5, however, in product level transmitter 500, the transmit frequency output 214 and the receive frequency output 218 are coupled to the microprocessor 430. During a calibration time interval, the microprocessor 430 can count the number of pulses on the transmit frequency output 214 and the receive frequency output 218 and calculate the frequency offset. If the frequency offset is correct, then the microprocessor takes no calibration action. If the frequency offset is incorrect, then the microprocessor can vary the division factors N1, N2, R1, R2 to find the range of pullability of the transmit and receive oscillators. The microprocessor 430 can then select updated values for N1, N2, R1, R2 that will provide the desired offset within the pullability ranges of both the transmit and receive oscillators. The microprocessor 430 can provide the updated frequency division factors R1, N1, R2, N2 and the configuration settings C1, C2 to the phase comparators at the end of the calibration interval.

Figure 7:
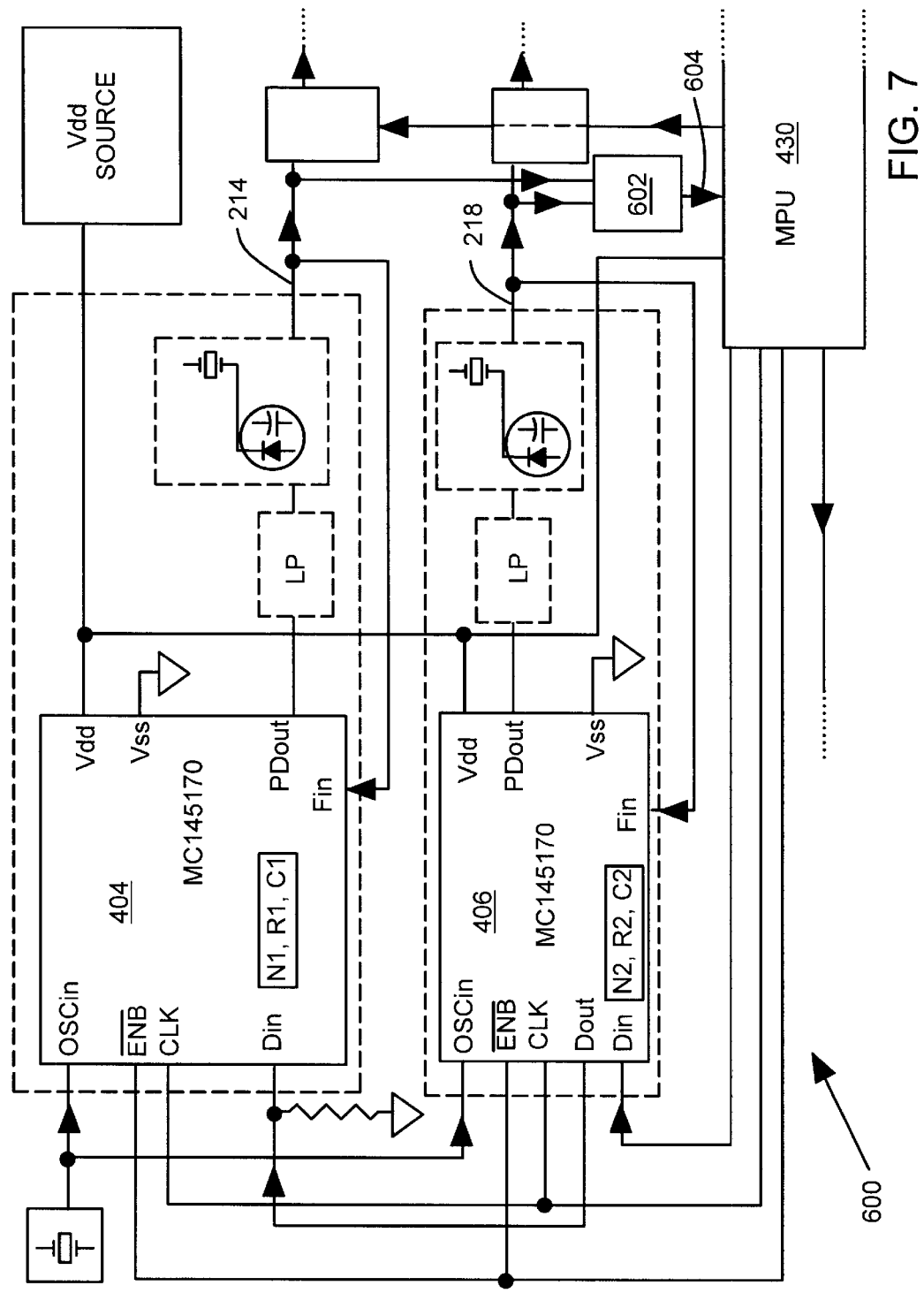
FIG. 7 schematically illustrates a block diagram of a fourth embodiment of a product level transmitter.

FIG. 7 schematically illustrates a block diagram of a fourth embodiment of a product level transmitter 600. The product level transmitter 600 is similar to the product level transmitter 500 illustrated in FIG. 6, and reference numbers used in FIG. 7 that are the same as reference numbers used in FIG. 6 identify the same or similar features.

In FIG. 7, transmit frequency output 214 and receive frequency output 218 are coupled to a difference frequency detector 602. The difference frequency detector 602 provides a difference frequency output 604 to the MPU 430. The arrangement with the difference frequency detector 602 reduces calculation overhead in the MPU 430. The difference frequency detector 602 preferably comprises a mixer and a low pass circuit (not illustrated).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for a radar level while maintaining substantially the same functionality without departing from the scope and spirit of the present invention. For example, the transmission path may include an antenna coupling through an open path to the product level or may include any of various known types of transmission lines extending from the radar level transmitter to the product level. In addition, although the preferred embodiment described herein is directed to crystal oscillators, it will be appreciated by those skilled in the art that other types of mechanical resonators, such as SAW devices, may be equivalent to a crystal oscillator. The teachings of the present invention can be applied to radar product level transmitters in a variety of frequency band without departing from the scope of the present invention.

What is claimed is:

1. A product level transmitter, comprising:
   a first pullable oscillator circuit that provides a transmit frequency output;
   a second pullable oscillator circuit that provides a receive frequency output, the receive frequency output being offset from the transmit frequency output by a frequency offset;
   a first pulse generator receiving the transmit frequency output and providing microwave transmit pulses couplable to the product level;
   a second pulse generator receiving the receive frequency output and, providing microwave gating pulses;
   a gate receiving the microwave gating pulses and couplable to the product level for receiving microwave transmit pulses reflected back from the product level that are delayed by a reflection delay time, the gate providing a gated delayed pulse output;
   a controller receiving the gated delayed pulse output and providing a level output representative of the product level; and
   a reference crystal oscillator circuit that provides a reference frequency output that is coupled to the first and second pullable oscillators; and the transmit and receive frequency outputs are pulled as functions of the reference frequency output.

2. The product level transmitter of claim 1 wherein a gating delay time between the microwave transmit pulses and the microwave gating pulses sweeps across a range of gating delay times that correspond with a range of product levels and wherein the gating delay time sweeps at a sweep rate that is stabilized by pulling both the transmit frequency output and the receive frequency output as functions of the same reference frequency.

3. The product level transmitter of claim 1 wherein the first pullable oscillator circuit comprises first circuit components that are substantially identical to second circuit components in the second pullable oscillator, the first and second circuit components having differing component parameters to provide the frequency offset.

4. The product level transmitter of claim 3 wherein the first pullable oscillator circuit comprises a first crystal and a first varactor diode, and the transmit frequency is pullable in a range of less than 200 parts per million.

5. The product level transmitter of claim 3 wherein the second pullable oscillator circuit comprises a second crystal and a second varactor diode, and the receive frequency is pullable in a range of less than 200 parts per million.

6. The product level transmitter of claim 1 wherein the first pullable oscillator circuit comprises a first phase comparator receiving the reference frequency output, and wherein the second pullable oscillator circuit comprises a second phase comparator receiving the reference frequency output.

7. The product level transmitter of claim 6 wherein the first pullable oscillator circuit comprises a first low pass filter coupled to the first phase comparator, and wherein the second pullable oscillator circuit comprises a second low pass filter coupled to the second phase comparator.

8. The product level transmitter of claim 6 wherein the first phase comparator pulls the transmit frequency as a function of a phase comparison of the reference frequency output divided by R1 and the transmit frequency output divided by N1 where R1 and N1 are frequency division factors.

9. The product level transmitter of claim 8 wherein the second phase comparator pulls the receive frequency as a function of a phase comparison of the reference frequency output divided by R2 and the receive frequency output divided by N2 where R2 and N2 are frequency division factors.

10. The product level transmitter of claim 9 wherein the controller couples to the first and second pullable oscillator circuits along a serial bus, and the controller provides the frequency division factors R1, N1, R2, N2.

11. The product level transmitter of claim 10 wherein the controller provides the frequency division factors R1, N1, R2, N2 during a time interval following application of power to the product level transmitter.

12. The product level transmitter of claim 10 wherein the frequency division factors R1, N1, R2, N2 are hard wired.

13. The product level transmitter of claim 10 wherein the controller is a microprocessor coupled to the phase comparators.

14. The product level transmitter of claim 10 wherein the frequency division factors R1, N1 differ from the frequency division factor R2, N2 by an amount that causes the frequency offset.

15. The product level transmitter of claim 10 wherein the controller provides the frequency division factors R1, N1, R2, N2 during a calibration time interval.

16. The product level transmitter of claim 10 wherein the first and second pullable oscillator circuits and the reference oscillator circuit have a combined power consumption of less than 10 milliwatts.

* * * * *